United States Patent [19]

Ishibashi et al.

[11] Patent Number: 5,295,131
[45] Date of Patent: Mar. 15, 1994

[54] OPTICAL INFORMATION RECORDING DISK HAVING EMBOSSED CLOCK MARK PITS AND EMBOSSED INFORMATION RECORDING PITS

[75] Inventors: Hiromichi Ishibashi, Toyonaka; Mitsuro Moriya, Ikoma, both of Japan

[73] Assignee: Matsushita Electric Industrial Co., Ltd., Osaka, Japan

[21] Appl. No.: 769,823

[22] Filed: Oct. 2, 1991

[30] Foreign Application Priority Data

Oct. 2, 1990 [JP] Japan .................................. 2-265644
Apr. 19, 1991 [JP] Japan .................................. 3-088484

[51] Int. Cl.$^5$ .............................................. G11B 7/09
[52] U.S. Cl. ............................... 369/275.3; 369/44.26; 360/78.08
[58] Field of Search ............... 369/275.3, 44.26, 44.39, 369/274, 32, 44.34, 50, 51, 111, 275.4, 116; 360/78.08, 78.11, 78.14

[56] References Cited

U.S. PATENT DOCUMENTS

| 4,428,075 | 1/1984 | Hazel et al. | 369/44.26 |
| 4,443,870 | 4/1984 | Hazel et al. | 369/275.3 |
| 4,704,711 | 11/1987 | Gereard et al. | 369/59 |
| 4,707,816 | 11/1987 | Yonezawa et al. | 369/44.26 |
| 4,858,221 | 8/1989 | Romeas | 369/275.3 |
| 5,128,916 | 7/1992 | Ito et al. | 369/44.26 |

*Primary Examiner*—Paul M. Dzierzynski
*Assistant Examiner*—Jim Beyer
*Attorney, Agent, or Firm*—Wenderoth, Lind & Ponack

[57] ABSTRACT

In a first optical disk, a plurality of sets of bit information record cells, each cell including a plurality of bit information record cells, and a plurality of clock marks are formed along a track line on a substrate, and the bit information record cells are formed for example as pits, wherein the recording or reading of a bit of information to or from the bit information record cells is effected with a laser head. The information record cells are arranged at mutual intervals smaller than the minimum read distance of the laser head, while the clock marks are provided so as to have a distance from a set of bit information record cell which is larger than the minimum read distance of the laser head so that the clock marks can be recognized by the laser head to be used for synchronization. Then, the recording density can be improved. In a second optical disk, track recognition marks are arranged as d spiral at equiangular distances so that there are an odd number of track recognition marks per track unit. Thus, even if the track pitch is on the order of the minimum read distance, the distance between adjacent wobble marks becomes is about double the minimum read distance so that the wobble marks can be recognized independently for tracking error detection.

19 Claims, 8 Drawing Sheets

OPTICAL INFORMATION RECORDING DISK HAVING EMBOSSED CLOCK MARK PITS AND EMBOSSED INFORMATION RECORDING PITS

BACKGROUND OF THE INVENTION

1. Field of the Invention

The present invention relates to an optical information recording medium of high recording density and a recording method thereof.

2. Prior Art

Figure 1:
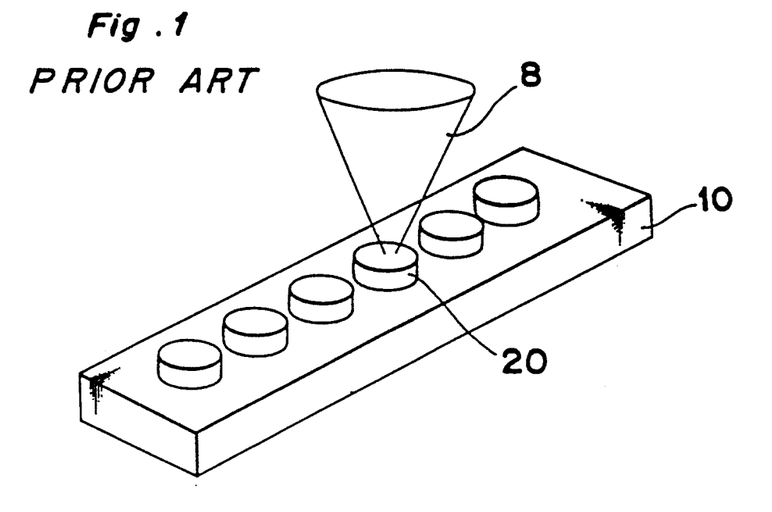
FIG. 1 is a perspective view of a prior art optical disk.

Recently, an optical disk has been developed for use as an information recording medium. FIG. 1 shows the structure of a prior art optical disk, wherein reference numeral 10 designates a substrate of the optical disk while reference numeral 20 designates a bit record cell formed as an embossed pit or a heap-bump on the substrate 10. The bit record cells 20 are formed on a track line. The bit record cells 20 are arranged at interval which are longer than a minimum read distance at which a laser optical head can detect each cell separately.

The optical disk can be used as an optical information recording medium. When information is recorded on an optical disk, an intense laser beam selectively radiates bit record cells 20 so as to heat them. This optical disk is advantageous because recording of a high S/N ratio and low jitter can be realized easily. That is, bit record cells 20 of equal size each in correspondence to a bit of information are formed on the substrate 10 as pits or bumps independently of each other so that each bit record cell is isolated thermally from the others. Therefore, when an intense laser beam pulse radiates a cell 20, the laser be&m does not affect adjacent bit record cells, and signals can be recorded only at desired bit record cells. Thus, fluctuations of record marks which become a factor with respect to jitter and noise when recording with laser pulse heating rarely occur.

Figure 2:
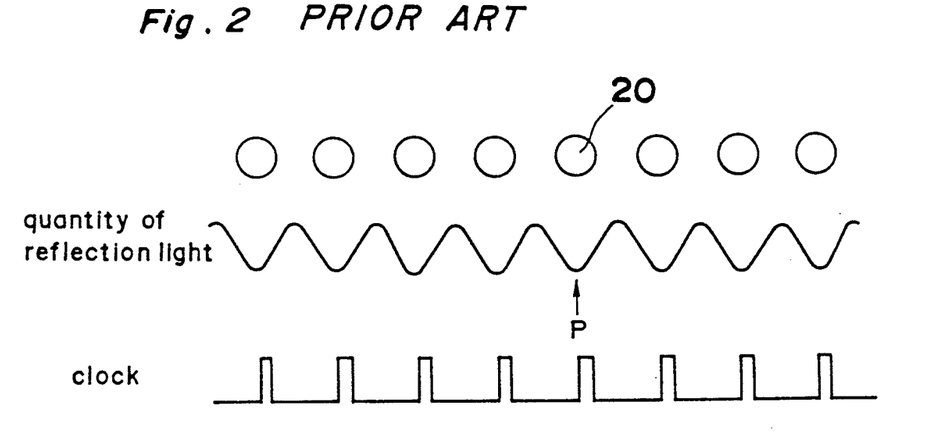
FIG. 2 is a diagram of prior art bit record cells, detection signal and clocks.

However, a laser beam should be located at the centers of the bit record cells 20 to be recorded when information is recorded with laser beams; otherwise, the laser beam may radiate between two adjacent bit record cells, thereby resulting in two bits being recorded incompletely. Therefore, it is necessary for a laser head to recognize the positions of the bit record cells which are to be recorded correctly before the information is recorded. In prior art disks, the positions are recognized from a change in the amount of reflected light when the laser beam scans the bit record cells 20. That is, as shown in FIG. 2, the amount of reflected light attains a minimum value (P in FIG. 2) when the laser beam scans around the center of a bit record cell 20. Then, clock signals are derived from the detected minimums of the signal and the laser beam is emitted intensely at the appropriate timings. Thus, information can be recorded surely on the bit record cells 20 so that the correct recording of information can realized (see for example, U.S. Pat. No. 4,811,331).

However, such a prior art optical disk has problems with respect to the enhancement of the S/N ratio of the optical disk and the recording density thereof. The recording density has an upper limit because each bit record cell cannot be recognized if the distance between adjacent bit record cells becomes smaller than the above-mentioned minimum read distance. That is, the bit record cells must be formed at intervals which are sufficiently wider than the minimum read distance. Otherwise the amount of reflected light does not change at all when the bit record cells are scanned. Thus, the position of each bit record cell 20 cannot be independently identified and information cannot be recorded correctly on the bit record cells 20.

A similar problem arises when the track pitch or the distance between adjacent tracks is narrowed. If the track pitch becomes narrower than the minimum read distance, the detection between two adjacent tracks or the detection of tracking error signals becomes impossible in principle, so that the tracking control necessary for recording and reading information cannot be performed.

SUMMARY OF THE INVENTION

An object of the present invention is to provide an optical information recording medium having a high recording density and a high S/N ratio.

In a first optical disk according to the present invention, wherein a bit information record cell is formed as a pit or a bump on a substrate and a bit of information is recorded and read on an information record cell with a laser head. A plurality of sets of bit information record cells, each including a plurality of bit information record cells, are formed on a track as well as a plurality of clock marks. The information record cells are arranged at mutual intervals smaller than the minimum read distance, while the clock marks are provided so as to have sufficient distance from the set of bit information record cells so as to be recognized by the laser head. Thus, the position of each bit record cell can be identified from the positions of the clock marks, and information can be correctly recorded on a desired information record cell. Then, the recording density can be improved.

In a second optical disk according to the present invention, track recognition marks are arranged in tracks each of which forms a 360° turn of a continuous spiral line at equiangular distances; and an odd number of track recognition marks is formed in each track. Moreover, track recognition marks of opposite detection polarity can be arranged alternately in the track. Thus, even if the track pitch is smaller than the minimum read distance, track recognition marks can be recognized independently. Thus tracking error signals can be detected while the recording track density can be increased.

An advantage of the present invention is that the recording density can be increased because information can be correctly recorded on at any bit record cell using a novel type of bit record cell arrangement.

Another advantage of the present invention is that a tracking error signal can be detected in an optical disk wherein the track pitch is on the order of the minimum read distance and all of the tracks are connected as a spiral line.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 3:
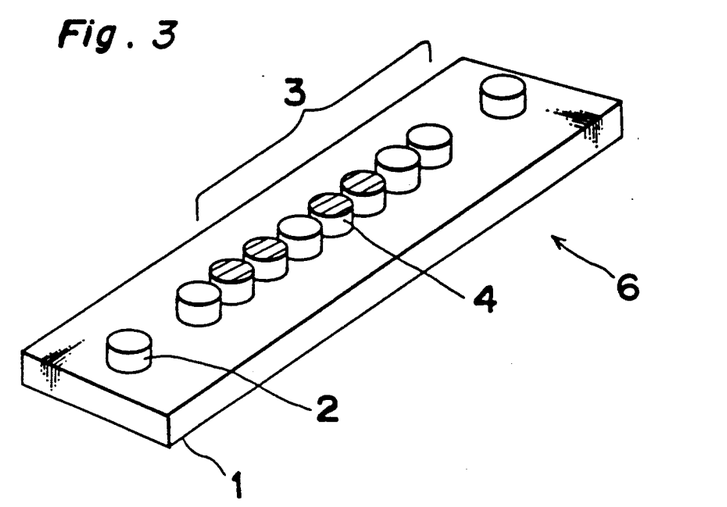
FIG. 3 is a perspective view of an optical disk of a first embodiment in accordance with the present invention.
Figure 4:
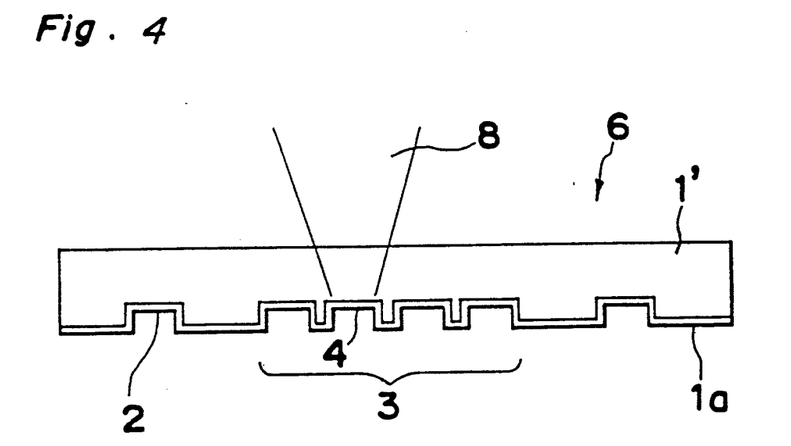
FIG. 4 is a sectional view of an optical disk of the first embodiment.

Referring now to the drawings, wherein like reference numerals designate like or corresponding parts throughout the several views, FIGS. 3 and 4 show a perspective view and a sectional view of a part of an optical disk 6 of a first embodiment of the present invention, respectively. In FIG. 3, reference numeral 1 designates a substrate of optical disk 6. Reference numeral 2 designates a clock mark formed as a pit or a bump; and the clock mark 2 is arranged along a recording track. Reference numeral 3 designates a set of bit record cells and reference numeral 4 designates a bit record cell. An optical recording film 1a is applied to a record plane of the substrate 1 on which bit record cells 3 are formed. (In FIG. 3, the film 1a is omitted for simplicity. In FIG. 4, a transparent replica 1' is formed on the optical recording film 1a.

The material of the optical recording film 1a may be an erasable material such as a phase-change type material based on tellurium oxide or a magneto-optic material, suitable for recording information optically.

The bit record cells 3 are aligned, and they are formed as pits or bumps each in correspondence to a bit of information on the same track as the clock mark 2. In contrast to prior art optical disks, the center-to-center distance between an arbitrary bit record cell 4 and another adjacent one is set within minimum read distance of a laser head used for recording and reading information. On the other hand, the distance between the clock mark 2 and an end of the set of bit record cells 3 is larger than the minimum read distance, and neither pits non-bumps are formed between them. The minimum read distance is defined by the diffraction limit or the minimum read resolution of laser head. The diffraction limit is expressed as $\lambda/2$ NA wherein $\lambda$ is the wavelength of the laser beam and NA is the aperture ratio of a laser beam emitted from the laser head.

The recording technique on an optical disk having the above-mentioned structure will be explained below. Information signals are successively recorded bit by bit in the bit record cells 3 by applying laser pulse heating, in a fashion similarly to that of a prior art optical disk. For example, when information "0" is recorded, the focused laser beam 8 is not emitted or is emitted at a sufficiently weak power while when information "1" is recorded, the laser beam 8 is emitted at a strong power so as to change the physical properties of the optical recording film 1a at the cell. The shaded cell 4 in FIG. 3 displays a cell recorded as "1".

In order to record information "1" in a desired bit record cell 4, it is necessary to increase the laser power sharply when the laser beam scans just around the center of the bit record cell 4. Therefore, it is necessary to recognize the position of each bit record cell 4. In the prior art optical disk mentioned above, it is possible to recognize the center position of each bit record cell by detecting a change in the amount of reflected light because the distance between adjacent bit record cells is sufficiently larger than the minimum read distance. However, each bit record cell 4 in this embodiment is arranged at a pitch smaller than the minimum read distance. Therefore, it is impossible to recognize each bit record cell 4. On the other hand, clock mark 2 can be recognized because it is arranged at prescribed positions separated from the set of bit record cells 3 by a recognizable distance.

Figure 5:
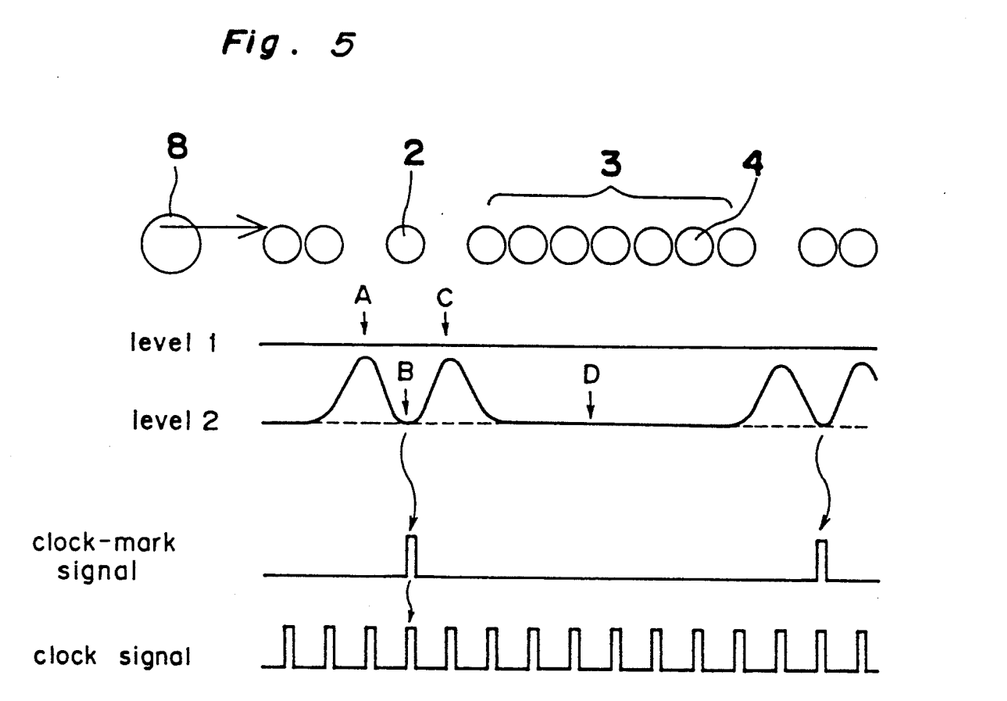
FIG. 5 is a timing chart of the operation of the first embodiment of the present invention.

In the middle in FIG. 5, the amount of reflected light is displayed when laser beam 8 scans the clock mark 2 and bit record cells 3 in the direction of an arrow shown in FIG. 5. In FIG. 5, level "1" shown as a solid line displays the level of the amount of reflected light when laser beam 8 radiates a mirror plane of the optical disk wherein neither pits nor bumps are formed, while level "2" shown as a dashed line displays the level of the amount of reflected light when laser beam 8 radiates pits or bumps. The clock mark 2 is surrounded by a mirror plane forward and backward along the track. When the laser beam 8 scans across the mirror plane, the clock mark 2 and the other mirror plane in succession, the amount of reflected light changes from level "1" (A in FIG. 5) to level "2" (B in FIG. 5) to level "1" (C in FIG. 5).

Therefore, a clock-mark signal can be derived from the amount of reflected light around the clock mark 2 which changes from A through B to C and it can be interpolated at an appropriate timing, and a clock signal can be derived from the clock-mark signal. When the clock signal is obtained, the laser beam can be turned on at suitable times in synchronization with the transition of clocks signal in order to record information on any bit in the set of bit record cells 3.

In repetition, when the laser beam scans in the set of bit record cells 3, each bit record cell 4 cannot be recognized independently because it is arranged at a pitch smaller than the minimum read distance. Therefore, if information "1" is not recorded, the reflected light in this area is constant at level "2" (D in FIG. 5).

Figure 6:
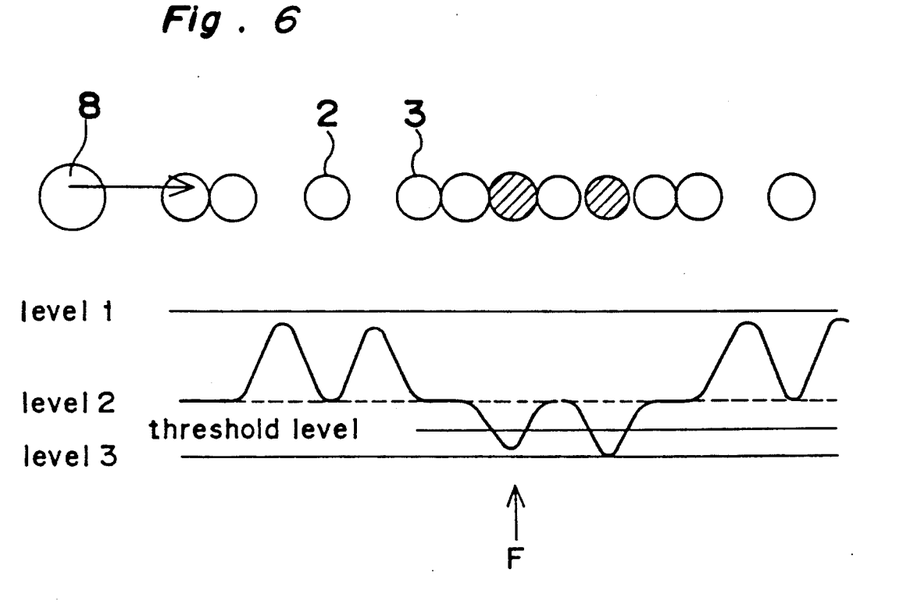
FIG. 6 is another timing chart of the action of the embodiment of the present invention.

The recorded information is read for example as shown in FIG. 6 which displays the amount of reflected light when the laser beam 8 scans in the direction of the arrow. Let us assume that the amount of reflected light becomes level "3" which is lower than level "2" when the laser beam 8 scans a bit record cell 4 wherein information is recorded (shaded cells in FIG. 6). That is, information "1" corresponds to level "3" as mentioned above. A threshold level is set between the levels "2" and "3", and information can be read easily from a change in the amount of reflected light light. As shown in FIG. 6, the amount of reflected light light becomes lower than the threshold level at the recorded cells (for example, point F), and the recorded cells can be recognized by comparing the amount of reflected light with the threshold level.

As explained above, an optical disk according to this embodiment includes the set of bit record cells 3 including a bit record cell 4 arranged at a pitch smaller than the minimum read distance and a clock mark 2 provided at a specified position which can be recognized by the laser head. Therefore, the optical disk has a higher recording density than a prior art disk.

Figure 7:
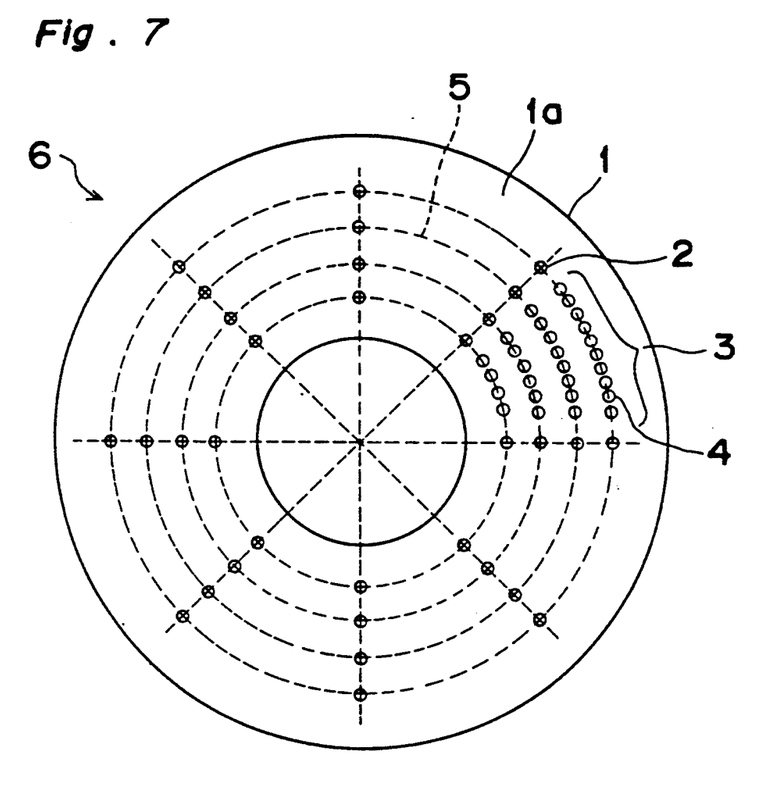
FIG. 7 is a top plan view of an optical disk of the first embodiment of the present invention.

Next, the entire structure of the optical disk 6 shown in FIG. 3 will be explained below with reference to FIG. 7, wherein the reference numerals 1, 1a, 2, 3 and 4 all designate the same elements as those shows in FIG. 3. That is, reference numeral 1 designates a substrate of a record medium for recording information, and reference numeral 1a designates an optical recording film applied to the substrate 1. Reference numeral 2 designates a clock mark and. 3 designates a set of bit record cells. Reference numeral 4 designates an arbitrary bit record cell in the set of bit record cells 3. Both the clock mark 2 and the bit record cell 4 are formed as pits or bumps.

This structure is characterized by the clock marks including the same number of clock marks 2 (eight in this embodiment) formed in every track 5 at equal mutual intervals and aligned in a radial direction among the tracks. Another characteristic is that the mutual distance between bit record cells is kept constant irrespective of track 5 by increasing the number of bit record cells in the sat of bit record cells 3 in an outer track as compared to the set of bit record cells 3 in an inner track.

The function of this arrangement of the optical disk will be explained below. The same number of clock marks (including the clock mark 2) in equal mutual distances are arranged in every track 5 in order to seek tracks fast for recording and reading operation. As already explained above, clock mark 2 is used as a marker for -generating the clock signal in order to record information correctly around the center of a bit record cell 4. Therefore, the clock mark 2 has always to be recognized. If the clock mark 2 is allowed to be located at arbitrary positions in every track, a pull-in operation is needed at each track for deriving clock signals. For example, when a jump from one track to another is performed, if the phase and the frequency of clock marks are different between the original track and the a new track, the displacement of the synchronization of a clock mark may occur and it takes a long time for the system to be synchronized again. Thus, a recording and reading operation cannot be processed rapidly after the track jump. Then, it is necessary for the clock mark 2 to be aligned so that it can be detected at the same phase in every track. The arrangement shown in FIG. 7 assures that the clock mark 2 can be detected at the same phase in every track.

In the above-mentioned arrangement of the clock mark 2, the distance from adjacent clock mark becomes larger as the track 5 moves toward the outer side of the optical disk. Then, if the number of bit record cells included in a set of bit record cells 3 is fixed in every track, the distance necessarily becomes greater at an outer track. Though this seems to be advantageous as to a prior art point of view, this may cause a malfunction for an optical disk according to this embodiment. That is, as already explained, recording and reading information from an optical disk are performed using the clock mark 2 as a marker. Then, if a bit record cell 4 is isolated so that a, change in the amount of reflected light due to each bit record cell can be observed, the distinction between the clock mark 2 and the set of bit record cells 3 becomes difficult as to a change in the amount of reflected light. On the other hand, if the distance between bit record cells at the outer tracks are made smaller than the minimum read distance, the mutual distance between bit record cells 4 becomes too small at an inner track to form an independent pit or bump cell f or each bit. Then, in this embodiment, the number of bit record cells in the set of bit record cells 3 at an outer track is larger than the set of bit record cells 3 at an inner track for keeping the mutual bit cell distance constant.

Next, a recording technique of the optical disk shown in FIGS. 31 4 or 7 will be explained below. As already explained, the optical recording film 1a is formed at every bit record cell 4 as shown in FIG. 4. Information is recorded by changing physical properties of the optical recording film 1a with laser-pulse heating.

Especially, if the optical recording film 1a is made of a phase-change material including tellurium oxide as a main component, not only recording and reading but also erasing and rewriting is possible. The phase-change material tends to become amorphous during rapid cooling from a high temperature and tends to become crystalline during slow cooling form a medium temperature. In this case, three-degree settings of the laser power is necessary: a weak power P1 for reading, a strong power P3 for recording or making the film amorphous (writing of "1"), and a medium power P2 for erasing or making the film crystalline (overwriting of "0").

Figure 8:
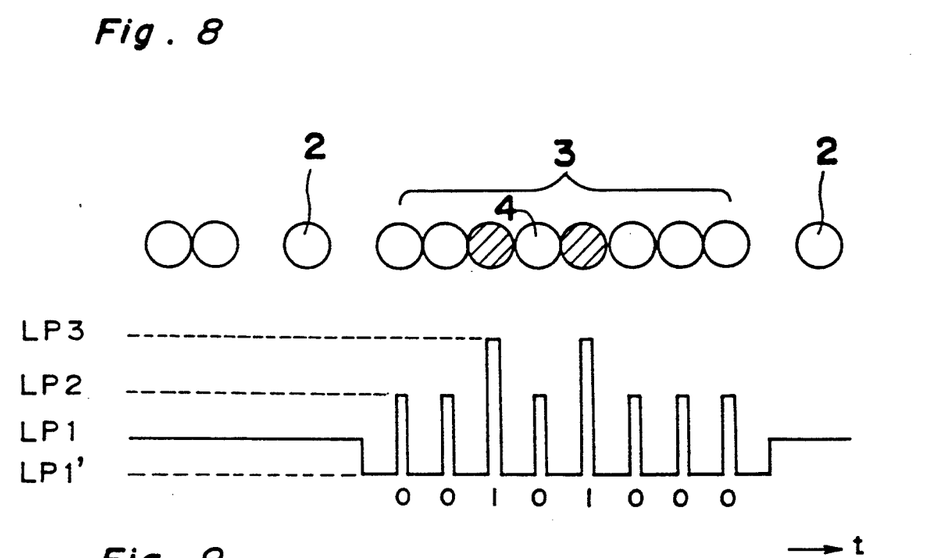
FIG. 8 is a timing chart of recording information.

FIG. 8 shows a waveform of intensity modulation of the laser beam when information of "0010100" is overmitten on a optical recording film 1a. When clock mark 2 is read, the laser beam is emitted with the smallest power LP1. On the other hand, when recording or erasing is performed at an arbitrary bit record cell 4 the laser power plunges to LP2 or plunges to LP3, respectively. The interval level LP1' between recording/erasing pulses is lower than LP1.

This pulse-like heating is performed due to the following reason: As already stated, the optical recording film 1a formed at the bit record cell 4 is isolated thermally from adjacent bit record cells, recording or erasing of information only at the bit record cell 4 is performed without affecting the surrounding cells. However, if the laser beam radiates a part of the adjacent bit record cell due to a timing error of laser oscillation or the like, the information at the adjacent bit record cell may be destroyed partly. Therefore, in order to secure the margin for such a timing error, the laser beam is emitted in a short pulse at the center of the cell 4, while the power level of laser beam is lowered to level LP1' (lower than LP1) when the laser beam passes the boundaries of neighboring bit record cells.

Figure 9:
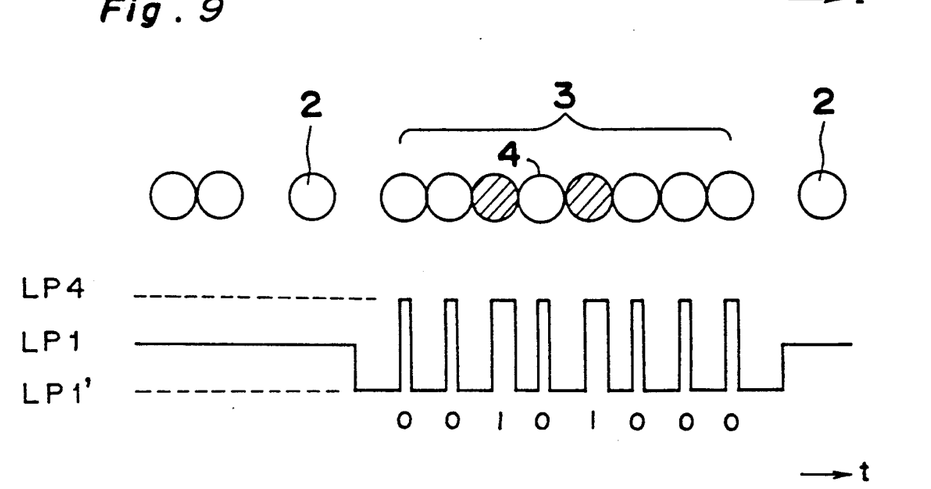
FIG. 9 is another timing chart of recording information.

Next, another type of recording and erasing procedure will be explained with reference to another timing chart shown in FIG. 9. In this technique, the same information of "0010100" as in the previous one is also written on the optical recording film 1a. However this is different from the previous one in a point that recording and erasing operations are performed not by changing laser power, but by changing the pulse width of the laser beam under a constant laser power LP4 larger than LP1. The purpose of this procedure is as follows:

A semiconductor laser is used as a light source of the laser beam. In general, the wavelength of the laser varies with light-emitting power. If the optical system, especially an object lens, has color dispersion, the focus point moves when the power of laser beam changes, causing the recording and erasing of information at a desired bit record cell to be performed incorrectly. Therefore the laser pulse width on recording and erasing is varied in order to change heat energy supplied to the optical information recording film 1a at a constant laser power. Thus, the wavelength deviation of laser beam can be suppressed, and recording and erasing can be performed more surely.

In the above-mentioned embodiment, each track 5 is formed circular as shown in rig. 7. However, the track may form a 360° turn of a continuous spiral line similarly to an optical disk of another embodiment which will be explained next.

Figure 10:
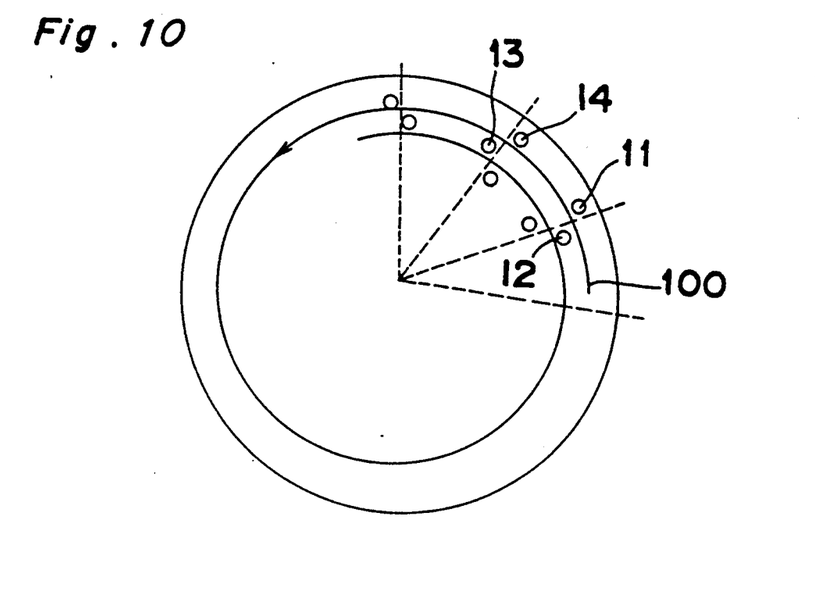
FIG. 10 is an elevated view in accordance with an optical disk of a second embodiment of the present invention.
Figure 11:
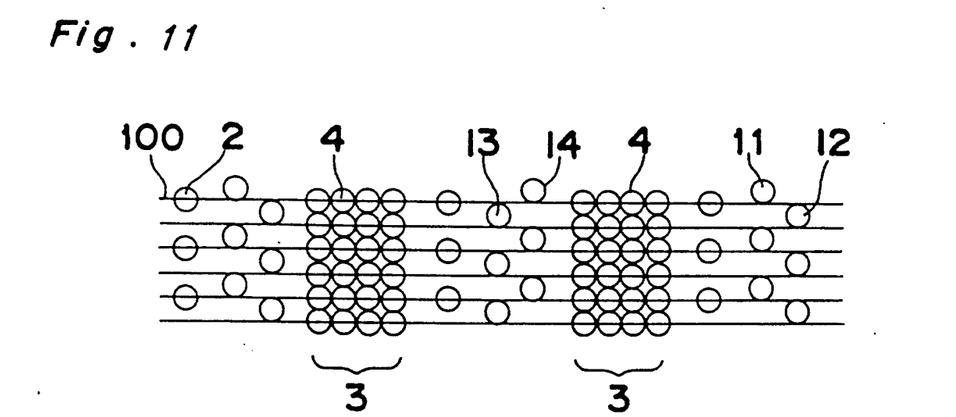
FIG. 11 is an enlarged view of in accordance with an optical disk of the second embodiment of the present invention.

In an optical disk of a second embodiment which will be explained next, the record density in the radial direction can be increased. FIG. 10 is a schematic top plan view of the optical disk displaying wobble marks provided for tracking error detection (bit record cells 4 are omitted for simplicity), while FIG. 11 shows a part of the optical disk displaying wobble marks and bit record regions. In FIG. 10, reference numeral 100 designates a center line of a track along which clock mark 2 and a set of bit record cells are arranged. Each track forms a 360° turn of a continuous spiral line. The track pitch is set as small as about the minimum read distance, 0.8 μm when the laser wavelength is 0.8 μm and NA is 0.5. Reference numerals 11 and 12 designate wobble marks, consisting of a first type wobble mark pair and formed along the track center line 100, while 13 and 14 designate wobble marks, consisting of a second type wobble mark pair, formed along the same track center line 100 next to the first wobble mark pair. Each wobble mark pair has a leading wobble mark which is detected first and a following wobble mark which is detected next. The wobble marks 11-14 are offset from the track center line 100 by a half of the track pitch. Thus, the wobble marks are located at the middle between track center lines. The wobble mark pair including two wobble marks as well as the clock mark 2 is arranged at equiangular positions between two sets of bit record cells 3. The number of the wobble mark pairs are the same in every track and they are aligned in radial directions.

The difference between the wobble marks 11 and 12 of the first pair and the marks 13 and 14 of the second pair is that the arrangement with respect to the track canter line 100 is reversed with respect to each other, as shown clearly in FIGS. 10 and 11. That is, when the track 100 is scanned by a laser head, the leading wobble mark 12 is detected first in the first wobble mark pair, and the leading wobble mark 14 is detected first in the second wobble mark pair. However, as to the location with respect to the track center line 100, the leading wobble mark 11 is arranged at the inside of the track center line 100, while the leading wobble mark 14 is arranged at the outside of the track center line 100. In the second type pair, the following wobble mark 13 is arranged at the same side as the leading wobble mark in the first type pair. Thus, tracking error signals derived from the wobble marks 11 and 12 of the first pair has a signal amplitude polarity opposite from those derived from the wobble marks 13 and 14 of the second pair. The tracking error is detected with a detector which will be explained below. If the amounts of light reflected from the wobble marks are the same, this means that the laser head is scanning along the track center line 100 correctly. However, if the amounts of light reflected from the wobble marks are not the same, this means that the laser head does is not scanning along the track center line 100, and the difference in the amounts of light between the leading wobble mark and the following mark in a pair of marks is different as to the sign of the difference or the difference has an opposite signal amplitude polarity.

The wobble marks 11 and 12 of the first pair are arranged alternately with those 13 and 14 of the second pair along the spiral track 100, and it is to be noted that the total number of first and second pairs (eleven for example) is odd per track.

Figure 12:
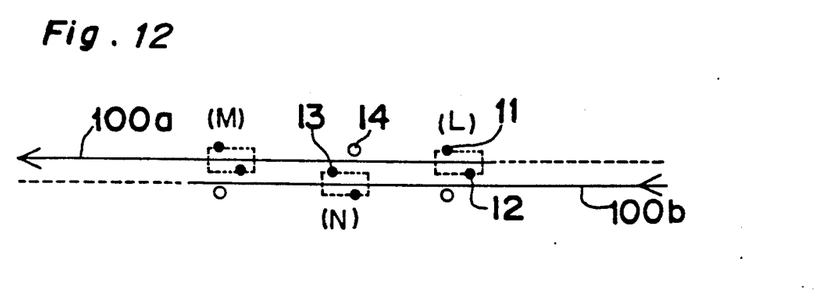
FIG. 12 is a schematic diagram for explaining the operation of the second embodiment of the present invention.

The meaning of the above-mentioned arrangement that the number of wobble mark pairs per track is odd will be explained below. FIG. 12 shows the function of the first and second pairs of wobble marks having the opposite signal amplitude polarity and arranged alternately. In FIG. 12, black marks designate wobble mark pairs of the first type for generating a tracking error signal of a polarity (for example positive polarity). Now, let us assume that the laser head is located at a position L along a track 100a. Then, the laser head can derive a tracking error signal of the positive polarity from the wobble marks 11 and 12. Next, the laser head scans wobble marks 13 and 14 of the second type of pair, and this latter pair gives a tracking error signal of the opposite polarity (negative polarity). A tracking detector can be designed to detect tracking error signals only of the positive signal amplitude polarity, otherwise the two tracking error signals compensate for each other. Therefore, a signal of the second pair should be ignored and the tracking error signal of the first pair of wobble marks is held up until the next first pair is detected at the position M. Then, tracking error signals of the same signal amplitude polarity can be obtained by detecting wobble mark pairs alternately.

It is to be noted that after the laser head has scanned a track 100a, it comes to the next track 100b. As mentioned above, the total number of wobble mark pairs of the first type (positive polarity) and of the second type (negative polarity) is set to be odd per track. Therefore, a wobble mark pair of the negative polarity at a position next to the position L along the track 100a is adjacent to a wobble mark pair of the opposite (positive) polarity at point N of the adjacent track 100b, as shown in FIG. 12. In other words, a wobble mark included in a wobble mark pair of one signal amplitude polarity in a track also consists of another wobble mark pair of the opposite polarity in the adjacent track. Thus, all tracks forms a continuous spiral line, and wobble mark pairs of the positive polarity and those of the negative one are arranged alternately along the spiral line.

To sum up, this optical disk has a track pitch of the order of the minimum read distance and has all, tracks connected continuously as a spiral and the first and second wobble mark pairs are arranged alternately along a continuous track line in order to generate tracking error signals of the signal amplitude polarity opposite to each other. Further, the total number of first and second wobble mark pairs is set to be odd per track. Therefore, tracking error signals can be detected from such a high density optical disk even when a spiral track is used and the track pitch is made less than the minimum read distance.

Figure 13:
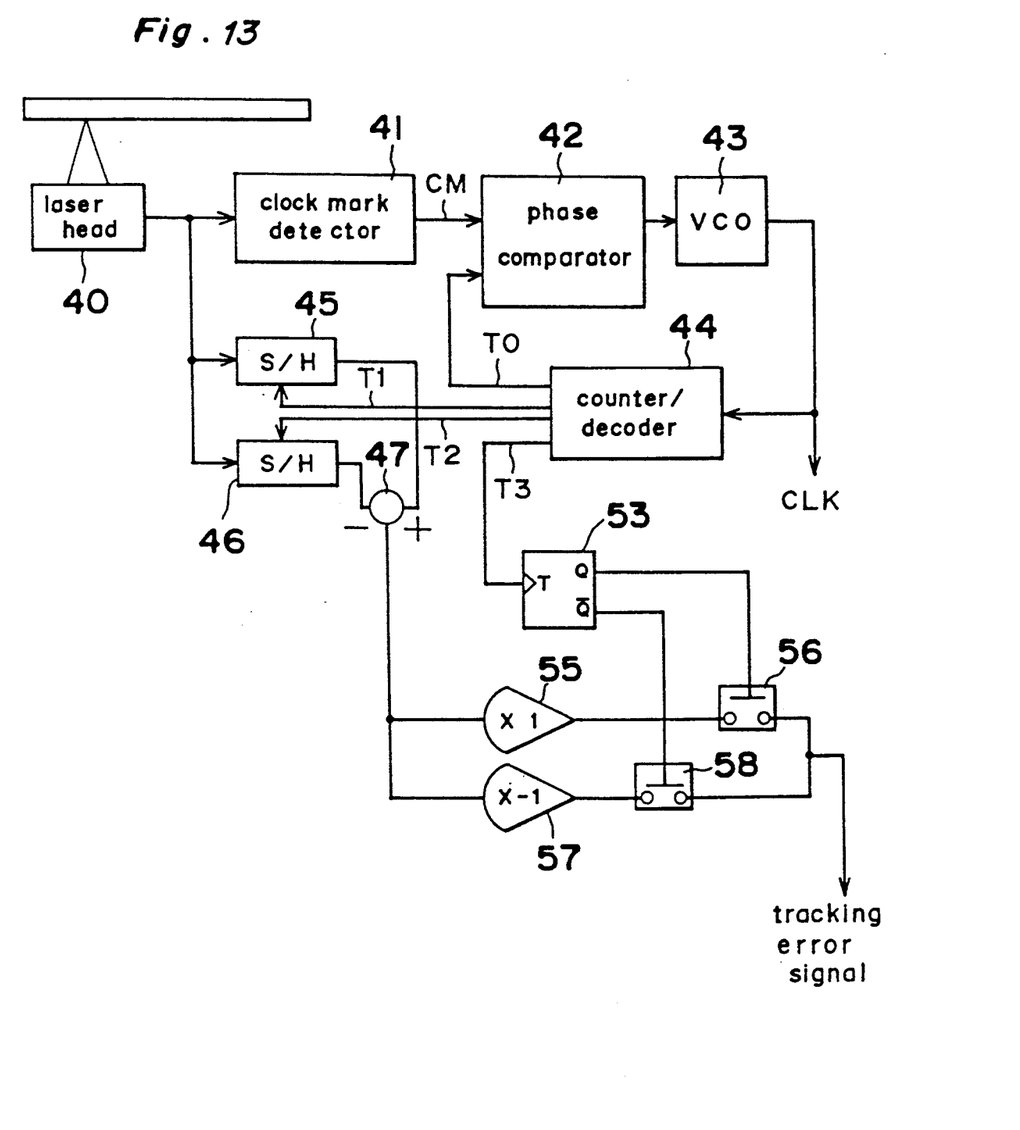
FIG. 13 is a block diagram of a tracking error detection system.

Next, a tracking error detection system for generating tracking error signals for the above-mentioned optical disk will be explained with reference to a block diagram of FIG. 13. In FIG. 13, reference numeral 40 designates a laser head for scanning an arbitrary track formed on an optical disk of the second embodiment. Reference numeral 41 designates a clock mark detector for detecting the clock mark 2 from signals obtained periodically by the laser head 40. The detection is performed as explained before with reference to FIG. 5. Reference numeral 42 designates a phase comparator for comparing the phase of the output signal (clock mark signal CM) of the clock mark detector 41 with a reference signal TO, reference numeral 43 designates a voltage-controlled oscillator for generating the clock signal CLK (clock shown in FIG. 5) according to the comparison rebuilt, and reference numeral 44 designates a counter/decoder for receiving the clock signal CLK, and sending the reference signal T0, all components 41–44 consisting of a phase locked loop. Reference numerals 45 and 46 designate sample-and-hold circuits for sampling-and-holding the output of the laser head 40 according to a pulse signal for sampling received from the counter/decoder 44. Reference numeral 47 designates a differential amplifier for obtaining the difference between the outputs of the two sample-and-hold circuits 45 and 46. Reference numerals 55 and 57 designate an noninverting amplifier and an inverting amplifier, respectively, for noninverting and inverting the output of the differential amplifier 47. Reference numeral, 53 designates d toggle flip flop for inverting the output logical level between the positive and negative logical outputs alternately when an output pulse T3 is received from the counter/decoder 44. Reference numerals 56 and 58 designate switching circuits for opening or closing the gate according to the noninverted or inverted output level of the toggle flip flop 53 for sending the output of the noninverting amplifier 55 and that of the inverting amplifier 57 as a tracking detection signal.

The function of the tracking error detection system will be explained below. The clock mark detector 41, the phase comparator 42, the voltage controlled oscillator 43, the counter/decoder 44 and the sample-and-hold circuits 45, 46 detect tracking error signals from the wobble marks 11, 12 or those 13, 14 shown in FIG. 11. That is, the clock mark detector 41 detects only clock mark 2 from the optical disk to derive a clock mark detection signal Cx (clock-mark signal shown in FIG. 5). The phase comparator 42 detects the phase difference between the clock mark detection signal CM and the reference signal TO, and the voltage controlled oscillator 43 generates the clock signal CLK according to the detected phase difference. The counter/decoder 44 divides the clock signals CLK to generate the reference signal TO. When the phase comparator 42 is under operation, the reference signal TO has the same phase as the clock mark detection signal CM.

The counter/decoder 44 divides the clock signals CLK further to send sample-and-hold timing signals TI and T2 at timings when the wobble marks 11 and 12 or 13 and 14 are read with the laser head 40. The samples-and-hold circuit 45 sample-and-holds an amplitude of leading wobble mark 12 or 14 at the timing T1, while samples-and-hold circuit 46 sample-and-holds an amplitude of following wobble mark 11 or 13 at the timing T2. Those amplitudes are caused to vary by tracking errors. The difference between the outputs of the two sample-and-hold circuits 45 and 46 gives a tracking error signal.

As shown in FIG. 11 the signal amplitude polarity of the wobble mark pairs or the arrangements of the position of the leading and following wobble marks against the track center line 100 is alternated in turn, so that the polarity of the tracking error signal detected by the above-mentioned circuit also changes alternately.

In the above-mentioned detector, it is shown that a tracking error signal of the same signal amplitude polarity can be detected by detecting wobble marks of the same polarity alternately skipping the wobble marks of the opposite polarity. However, this means that the amount of information on tracking error is halved, and this is not desirable for a tracking control system. Then, a part of the detector will be provided in order to detect tracking error signals of the same polarity without decreasing the amount of information on tracking errors.

When the timing signal T3 received from the counter/decoder 44 rises, the noninverted and inverted outputs of the toggle flip flop 53 are inverted successively to select the outputs of the noninverting and inverting amplifiers 55 and 57. Then, the noninverting amplifier 55 becomes effective for wobble mark pairs of the positive polarity, while the inverting amplifier 57 becomes effective for wobble mark pairs of the negative polarity. Thus, tracking error signal of the same signal amplitude polarity can be obtained. The timing signal T3 is a periodical pulse signal obtained by decoding the clock signals CLK at appropriate timings before wobble mark pairs are detected.

Figure 14:
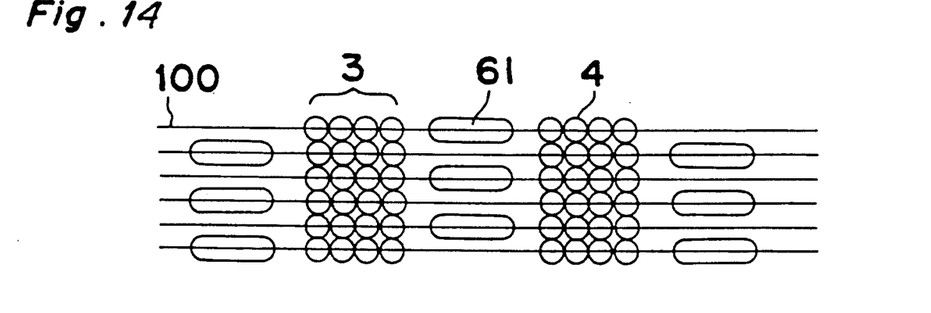
FIG. 14 is a partial view of in accordance with an optical disk of a third embodiment of the present invention.

Next, an optical disk of a third embodiment will be explained, in which the disk is the same as that of the second embodiment except that a tracking groove 61 of a finite length is provided on the track center line instead of the first wobble mark pairs 11–12 and no groove is provided instead of the second wobble mark pairs 13–14 provided in the second embodiment, and the number of the grooved and non-grooved zones is odd per track. FIG. 14 displays an essential part of optical disk of Example 3, wherein reference numeral 100 designates a track center line, similarly to the second embodiment (FIG. 11). in this embodiment, a first track recognition mark consist of a groove 61 located in a track and a second track recognition mark consists of a mirror zone surrounded by grooves located in adjacent tracks. In a fashion to that of the second embodiment, tracking error signals of the positive and negative polarities can be obtained alternately in this embodiment. A method for obtaining tracking error signals from grooves is disclosed for example in U.S. Pat. No. 4,704,711. Therefore, it is also possible to form a track of double density continuously in this embodiment. A characteristic of this embodiment is that the structure of the optical disk becomes simpler. That is, in an optical disk of the first and second embodiments, it is necessary to form wobble marks apart from the track center line by a half of track pitch. On the other hand, in this embodiment, a similar tracking error detection can be realized by forming a groove on the track center-line.

As explained above, an optical disk of high track density can be realized with use of a simpler structure by forming grooves of the track center line alternately instead of the first and second wobble mark pairs.

The wobble marks or the grooves provided in the above-mentioned embodiments may also be used for optical disks not explained above.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An optical disk, wherein a plurality of bit information record cells composed of embossed pits or bumps are formed along a track line on a disk substrate, a bit of information is recorded on one of said bit information record cells using a laser optical head, and said bit of information is read by said laser optical head, comprising:
    sets of bit information record cells, wherein bit information record cells are arranged along a track line, a mutual distance of every two adjacent bit information record cells being smaller than a diffraction limit of a laser beam emitted from said laser optical head, said diffraction limit being defined by an aperture and a wavelength of said laser beam;
    a recording film at least being formed on each of said bit information record cells; and
    clock marks for providing a scanning position of said laser beam, composed of embossed pits or bumps, formed on said track line, each of said clock marks being located remote from said bit information record cells at a distance larger than said diffraction limit.

2. An optical disk according to claim 1, wherein the mutual distance of each of said two adjacent bit information record cells is kept the same.

3. An optical disk according to claim 1, wherein said clock marks are formed on co-centered circular track lines or a spiral track line, the same number of said clock marks being formed on each of said co-centered circular track lines or each turn of said spiral track line, said clock marks being aligned at radial equiangular positions.

4. An optical disk according to claim 3, wherein the number of bit information record cells in said set of bit information record cells is larger at an outer track line than at an inner track line so as to keep the mutual distance of said two adjacent bit information record cells the same.

5. An optical disk according to claim 1, wherein said optical record film includes phase-change type material, which melts and becomes amorphous upon exposure to a laser beam pulse.

6. An optical disk according to claim 5, wherein said phase-change type material becomes amorphous upon exposure to a laser beam pulse of a film irradiation power in a record procedure and becomes crystalline upon exposure to a laser beam pulse of a second irradiation power in an erase procedure, said first irradiation power being larger than said second irradiation power.

7. An optical disk according to claim 1, wherein said laser optical head converts a power of said laser beam reflected from said clock mark to an electrical signal while scanning a track line, said electrical signal being synchronized with a clock signal so that said clock signal occurs at a very time when said laser optical head scans a center of each bit information cell.

8. An optical disk, wherein a plurality of bit information record cells composed of embossed pits or bumps are formed along a track line on a disk substrate, a bit of information is recorded on one of said bit information record cells using a laser optical head, and said bit of information is read by said laser optical head, comprising:
    sets of bit information record cells wherein bit information record cells are arranged along a spiral track line, a mutual distance of every two adjacent bit information record cells being smaller than a diffraction limit of a laser beam emitted from said laser optical head, said diffraction limit being defined by an aperture and a wavelength of said laser beam;
    a recording film at least being formed on each of said bit information record cells;
    clock marks for providing a scanning position of said laser beam, composed of embossed pits or bumps, formed on said track line, each of said clock marks being located remote from said bit information record cells at a distance larger than said diffraction limit; and
    track recognition marks arranged along said spiral track line at equiangular positions, each track recognition mark being arranged between two sets of bit information record cells, the number of the track recognition marks being odd per one turn of said spiral track line.

9. An optical disk according to claim 8, wherein a distance between two adjacent turns of said spiral track line is approximately equal to said diffraction limit.

10. An optical disk according to claim 8, wherein said track recognition marks are classified as first track recognition marks and second track recognition marks, being arranged alternately, said first track recognition mark and second track recognition mark being detected with a signal amplitude polarity opposite to each other.

11. An optical disk according to claim 10, wherein said track recognition mark consists of a first mark and a second mark, said first and second marks are located inside and outside said spiral track line at said first track recognition mark and said first and second marks are located outside and inside said spiral track line at said second track recognition mark.

12. An optical disk according to claim 10, wherein said first track recognition mark consists of a groove of finite length and said second track recognition mark consists of a flat zone surrounded by grooves located in adjacent turns of track lines.

13. An optical disk according to claim 8, wherein the number of said clock marks in every turn of said spiral track line is the same and the clock marks in every track are aligned in radial equiangular positions.

14. A tracking error detection system for detecting a tracking error from a track line on an optical disk, on which clock marks are arranged in said track line for providing a scanning position of a laser beam emitted from a laser optical head, and track recognition marks arranged in said track line, said track recognition marks being classified as first track recognition marks and second track recognition marks, being arranged alternately, said first track recognition mark and second track recognition mark being detected with a signal amplitude polarity opposite to each other, comprising:
    a detection means for detecting and converting an amount of light from said laser beam which has been reflected from said clock marks and said first and second track recognition marks into an electrical read signal;

a mark synchronization means for generating a pulse signal at a timing when each of said clock marks is detected by said detection means; and a tracking error producing means for obtaining first and second tracking error signals from said electrical read signal, said first tracking error signal being produced from the electrical read signal when said first track recognition mark is detected, said second tracking error signal being produced from the electrical read signal when said second track recognition mark is detected; wherein each of said first and second track recognition marks consists of a first mark and a second mark, said first and second marks of said first track recognition mark are respectively located inside and outside said spiral track line at said first track recognition mark and said first and second marks of said second track recognition mark are respectively located outside and inside said spiral track line at said second track recognition mark.

15. A tracking error detection system for detecting a tracking error from a track line on an optical disk, on which clock marks are arranged in said track line for providing a scanning position of a laser beam emitted from a laser optical head, and track recognition marks arranged in said track line, said track recognition marks being classified as first track recognition marks and second track recognition marks, being arranged alternately, said first track recognition mark being and second track recognition mark being detected with a signal amplitude polarity opposite to each other, comprising:

a detection means for detecting and converting an amount of light from said laser beam which has been reflected from said clock marks and said first and second track recognition marks into an electrical read signal;

a mark synchronization means for generating a pulse signal at a timing when each of said clock marks is detected by said detection means; and a tracking error producing means for obtaining first and second tracking error signals from said electrical read signal, said first tracking error signal being produced form the electrical read signal when said first track recognition mark is detected, said second tracking error signal being produced from the electrical read signal when said second track recognition mark is detected; further comprising a polarity inversion means for inverting the signal amplitude polarity of said second tracking error signals; where in each of said first and second track recognition marks consists of a first mark and a second mark, said first and second marks of said first track recognition mark are respectively located inside and outside said spiral track line at said first track recognition mark and said first and second marks of said second track recognition mark are respectively located outside and inside said spiral track line at said second track recognition mark.

16. A tracking error detection system according to claim 14, said mark synchronization means comprising:

a clock mark detection means for fetching clock mark signals, caused by said clock marks selectively from said electrical read signal;

a phase comparator for detecting the phase difference between said clock mark signal and a reference signal;

a voltage controlled oscillator for generating a clock signal for the frequency controlled by said phase comparator;

and a counter/decoder for generating the reference pulse signal from the clock signal;

said tracking error producing means comprising:

first and second sample-and-hold circuits for sampling-and-holding the electrical read signal when said first and second marks of either of said first and second track recognition marks are detected respectively; and a differential amplifier for producing said first and second tracking error signals by obtaining the difference between the outputs of the first and second sample-and-hold circuits.

17. A tracking error detection system according to claim 15, said mark synchronization means comprising:

a clock mark detection means for fetching clock mark signals, caused by said clock marks selectively from said electrical read signal;

a phase comparator for detecting the phase difference between said clock mark signal and a reference signal;

a voltage controlled oscillator for generating a clock signal of the frequency controlled by said phase comparator;

and a counter/decoder for generating the reference pulse signal from the clock signal;

said tracking error producing means comprising:

first and second sample-and-hold circuits for sampling-and-holding the electrical read signal when said first and second marks of either of said first and second track recognition marks are detected respectively; and a differential amplifier for producing said first and second tracking error signals by obtaining the difference between the outputs of the first and second sample-and-hold circuits.

18. A tracking error detection system according to claim 16, further comprising a polarity inversion means for inverting the signal amplitude polarity of said first and second tracking error signals obtained by said tracking error producing means, said polarity inversion means comprising:

a toggle flip flop for inverting its output and complimented output when a change control pulse signal is input thereto by said counter/decoder; and a polarity change circuit for inverting or not inverting the output of said differential amplifier according to whether the output of said flip flop is a high level or a low level.

19. A tracking error detection system according to claim 17, further comprising a polarity inversion means for inverting the signal amplitude polarity of said first and second tracking error signals obtained by said tracking error producing means, said polarity inversion means comprising:

a toggle flip flop for inverting its output and complimented output when a change control pulse signal is input thereto by said counter/decoder; and a polarity change circuit for inverting or not inverting the output of said differential amplifier according to whether the output of said flip flop is a high level or a low level.

* * * * *